United States Patent [19]
Munetoh et al.

[11] Patent Number: 5,742,625
[45] Date of Patent: Apr. 21, 1998

[54] DATA STORAGE SYSTEM AND PARITY GENERATION METHOD FOR DATA STORAGE SYSTEM

[75] Inventors: Seiji Munetoh, Setagaya-ku; Hideto Niijima, Toshima-ku; Hiroki Murata, Suginami-ku; Nobuaki Takahashi, Machida, all of Japan

[73] Assignee: International Business Machines Corporation, Armonk, N.Y.

[21] Appl. No.: 592,281

[22] Filed: Jan. 26, 1996

[30] Foreign Application Priority Data

Jan. 26, 1995 [JP] Japan ................... 7-010435

[51] Int. Cl.⁶ .................. H03M 13/00; G11C 29/00
[52] U.S. Cl. ............. 371/49.2; 371/37.7; 371/40.1; 370/242
[58] Field of Search ............... 371/49.2, 48, 35, 371/37.1, 40.1, 40.2, 49.1, 37.7, 40.4; 395/182.03, 183.18, 183.19, 185.07; 364/243.2, 243.6, 265, 265.1, 265.2, 265.3, 266.3, 943.9, 944.5; 370/13, 32, 53, 54, 216, 241, 242, 248

[56] References Cited

U.S. PATENT DOCUMENTS

| | | | |
|---|---|---|---|
| 5,185,876 | 2/1993 | Nguyen et al. | 395/425 |
| 5,208,813 | 5/1993 | Stallmo | 395/182.05 |
| 5,226,010 | 7/1993 | Glider et al. | 365/189.04 |
| 5,388,243 | 2/1995 | Glider et al. | 395/425 |
| 5,463,643 | 10/1995 | Gaskins et al. | 371/40.1 |
| 5,469,566 | 11/1995 | Hohenstein et al. | 395/182.04 |
| 5,499,337 | 3/1996 | Gordon | 395/182.04 |

OTHER PUBLICATIONS

H. Murata et al., "RAID Subsystem Structure Using ATA Drives", Academic Society of Electronic Data Communications Conference, Fall 1994, D–88, p. 93. (Translation Included).

P. Chen et al., "Introduction to RAID", Computer Science Division, Department of Electrical Engineering and Computer Sciences, UC Berkeley, CA., Dec. 1988, Report No. UCB/CSD 88/479, pp. 1–12.

M. Schulze et al., "How Reliable is a RAID", Computer Science Division, Electrical Engineering and Computer Science Department UC Berkeley, CA. pp. 1–12.

Primary Examiner—Robert W. Beausoliel, Jr.
Assistant Examiner—Trinh L. Tu
Attorney, Agent, or Firm—Esther E. Klein

[57] ABSTRACT

An object of the present invention is to provide a data storage system and a parity generation method for the data storage system which make generation of parity easier and which are capable of performing the reconstruction of data at the time of an occurrence of failure with high efficiency and high speed.

A data storage system is provided comprising a plurality of devices for storing data, a plurality of data buses for transferring the data, and a selector connected between the plurality of devices and the plurality of data buses for selectively connecting a device and a data bus using a predetermined combination, the selector including a parity operation generator.

6 Claims, 3 Drawing Sheets

DATA STORAGE SYSTEM AND PARITY GENERATION METHOD FOR DATA STORAGE SYSTEM

FIELD OF THE INVENTION

The present invention relates to a data storage system and a parity generation method for the data storage system, and more particularly to a data storage system for writing or reading out data to or from a desired storage device of a storage device group and a method of generating parity according to that data.

BACKGROUND OF THE INVENTION

As the amount of data a computer can process increases, enhancements in the processing capability and reliability of a storage system have been required. A RAID (redundant array of inexpensive disks) system meets that requirement. A RAID system which has a plurality of hard disk drives functioning to appear as a single hard disk drive to make the capacity larger and enhance the processing speed. In the case of disk drive failure, RAID system can identify and reconstruct the data stored in the damaged disk drive through the use of parity data thereby assuring high reliability.

The goals of making systems structurally simpler and the speed of data reproduction higher have particularly been desired in recent years. The technique of sharing a data bus meets such needs. Sharing a data bus reduces the number of buses in a system and makes a system structurally simpler. As a concrete conventional example there is "RAID Subsystem Construction using ATA Storage Means" (Electronic Information Communication Academic Society of Japan, Great Autumn Meeting, D-88, 1994). This is a technique in which data buses DD0 and DD1 (FIG. 1) are shared and crossbar switches are respectively provided between each hard disk drive and each data bus.

Figure 1:
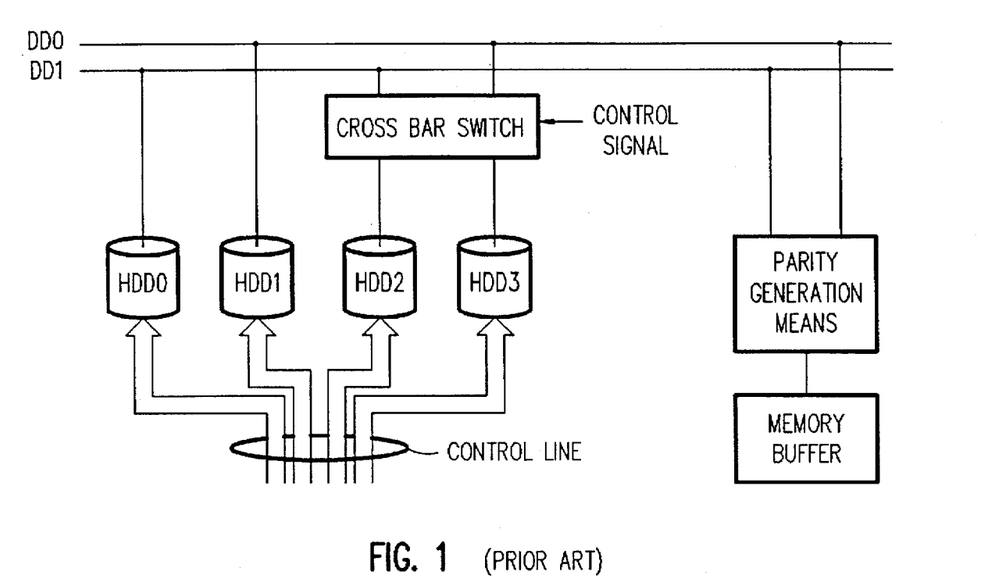
FIG. 1 is a block diagram showing a conventional system.

The technique of sharing data buses will be described in brief with reference to FIG. 1, which is a block diagram showing background art. Two data buses DD0 and DD1 are connected with four hard-disk drives (hereinafter referred to as HDDs) HDD0 to HDD3. The HDD0 and HDD1 of the four HDDs are connected directly to the two data buses DD0 and DD1. The HDD2 and HDD3 are connected through a crossbar switch to the two data buses. Each of the data buses DD0 and DD1 can be connected through the crossbar switch to both the HDD2 and the HDD3. That is, the two channels of the crossbar switch with four channels are respectively connected to the data buses DD0 and DD1 and the two remaining channels are respectively connected to the HDD2 and the HDD3, so arbitrary connection between HDD2, HDD3 and each data bus becomes possible. Also, the respective HDDs are controlled for writing data to them or reading out data from them through control lines of a data bus controller. The data buses DD0 and DD1 are further connected with parity generation means for generating parity. This parity generation means is connected to a parity buffer memory for holding the parity.

Since in this technique two data buses are provided, the parity can be generated effectively in normal operation in which there are no damaged HDD. However, in the case of HDD failure such that there is a damaged HDD, the parity operation for reconstituting the data of the damaged HDD takes several times as much time as normal operation because the parity operation requires the transmission of a large amount of data.

The reconstruction of data in this technique as failure occurred will be described further with reference to the case where the HDD0 had failed. First, the data stored in the HDD1 is transferred to the data bus DD0, a predetermined control signal is inputted to the crossbar switch so that the switch connects the HDD2 and the data bus DD1, and the data stored in the HDD2 is transferred to the data bus DD1. Based on the transferred data of the HDD1 and HDD2, the parity generation circuit calculates the exclusive OR operation of the transferred data, and the result is stored in the parity buffer memory. Then, the data of the HDD3 is transferred to the data bus, and the parity generation circuit calculates the exclusive OR operation between the transferred data of the HDD3 and the data stored in the parity buffer memory. Since this obtained data and the data stored in the damaged. HDD0 are identical in value, the data of the HDD0 can be identified by these two transfer steps.

However, since two transfer steps are needed for the above-described reconstruction of data as failure occurred, the step of transferring data to a data bus will be carried out two times more then with the normal operation in which there is no damaged HDD. The above-described case involved four HDDs. As the number of HDDs is increased, more parity operations need to be done to reconstitute data of a damaged disk, so the number of times the transfer step and parity operation are performed increases. Therefore, a longer period of time is needed as compared with the normal operation. Further, since in fact, in accessing a plurality of HDDs, the seek time and rotational delay time have to be taken into consideration, a great reduction in the operational performance of the system as failure occurred cannot be avoided.

In the conventional system with shared data buses, the parity generation means is connected through the data bus with the HDD in which data has been stored, as described above. The number of transfers to the data bus is increased and the execution speed is reduced when a plurality of HDDs are accessed at the same time to do the parity operation, such as in an occurrence of failure. This is because as the result of having the data bus shared, the amount of data that can be transferred at the same time is reduced.

In view of such problems, it is an object of the present invention to provide a data storage system and a parity generation method for the data storage system which make transfer operations easier by reducing the number of times a transfer step is performed for parity generation and which are capable of performing the reconstruction of data at the time of an occurrence of failure with high efficiency and high speed.

SUMMARY OF THE INVENTION

In order to solve the above problems, there is provided according to the present invention, a data storage system which comprises a plurality of storage devices having data stored therein, a plurality of data buses through which data is transferred, and a selector provided between said plurality of storage devices and said plurality of data buses, selectively connecting the storage devices and the data bus by a predetermined combination, the selector including a capability of calculating a parity operation such as an exclusive OR operation.

The storage devices preferably refers to storage devices for recording data on a recording medium or reproducing data from the medium as described in the detailed description of an embodiment. The storage devices, therefore, are not limited to hard-disk drives or optical magnetic disk storage means.

In a preferred embodiment, the present invention also includes a data path controller for monitoring the activity status of the storage devices, and the parity operation is selectively executed in response to the control signal outputted by the data path controller. It is preferable that when the control signal is in a first state, the parity operation is performed, and when the control signal is in a second state, the parity operation is not performed.

The selector in the present invention may preferably have a memory for temporarily storing the data obtained by the parity operation.

The present invention may preferably have a parity generation circuit connected to the data buses.

In another preferred embodiment of the invention a data storage system comprises a plurality of storage devices in which data is stored, a plurality of data buses for transferring said data, and a selector connected between said plurality of storage devices and said plurality of data buses and including a parity operation calculator for performing parity operation and a multiplexer. The calculator calculates parity of data supplied to said plurality of storage devices from said plurality of data buses in response to a control signal and outputs parity data, and the multiplexer selectively supplies data from said plurality of buses to any one of said plurality of storage devices, and said parity data to said plurality of storage devices or said plurality of data buses, in response to an address signal. The multiplexer used herein also preferably has a decoding function. The parity operation may be an exclusive OR operation.

It is preferable that the selector have a mode of stopping to supply said parity data to all of the storage devices connected thereto or all of the data buses connected thereto.

The selector may further have a holder that is controlled by a second control signal. This holder being constructed to hold the parity data temporarily when the second control signal is in a predetermined state.

The data storage system may further comprise a parity generation circuit connected to the plurality of data buses, wherein the parity generation circuit can calculate parity between the parity data obtained by said calculator and supplied to the data buses and other data supplied to the parity generation circuit.

The data storage system may further comprise a parity buffer memory connected to the parity generation circuit, wherein the parity buffer memory may store the parity data obtained by the parity generation circuit.

In another preferred embodiment of the invention, a data storage system comprises a plurality of storage devices for storing data, a plurality of data buses for transferring said data, and a selector with a plurality of channels respectively connected to said plurality of storage devices and to said plurality of data buses. The selector means includes a plurality of first gates, operation calculators for performing parity operation, and a plurality of multiplexers. Each of the plurality of first gates transfers data supplied to the channel in response to a first control signal. The operation calculator calculates parity of each data set transferred by said plurality of first gates and outputs parity data. The data of the respective channels and said parity data are input to each of said multiplexers with combinations different for each multiplexer, and each of said multiplexers output data of said combinations in response to an address signal and selectively supplies to one of said channels the data of the other of said channels or said parity data. Preferably the parity operation is an exclusive OR operation.

The selector may further have a holder that is controlled by a second control signal. When other data has already been supplied to the channel to which said parity data is to be supplied, said holder may hold said parity data temporarily by making said second control signal a predetermined state.

The selector preferably includes a holder that is controlled by a second control signal. When other data have already been supplied to all of said channels, the holder may hold said parity data temporarily by making said second control signal a first state. Thereafter, the holder may output said parity data to any of said channels by making said second control signal a second state.

The storage system may further comprise a parity generation circuit with a plurality of channels, and a parity buffer memory. The channels of said parity generation circuit may be connected to said plurality of data buses and said buffer memory, respectively.

The parity generation circuit may calculate second parity data, which is parity between said parity data supplied to one of said channels connected to one of said data bus and other data supplied to the other channel connected to the other data bus, and supply said second parity data to the channel connected to said parity buffer memory.

In another preferred embodiment of the invention, a parity generation method for a data storage system is provided. The method comprises the steps of providing a plurality of storage devices for storing data, a plurality of data buses for transferring said data, and a plurality of selectors; dividing said plurality of storage devices into a plurality of groups; connecting said plurality of storage devices and said plurality of data buses to the selector for each group; wherein when any of said plurality of storage devices is damaged, in one of the remaining groups other than the group having the damaged storage means, having the selectors of the remaining groups calculate, parity data, which is parity of the data of the storage devices in the remaining groups. The method further comprises the steps of supplying said parity data to said data bus, and identifying the data of said damaged storage device on the basis of the data of the storage devices of said group having said damaged storage device and of the transferred parity data.

In a further embodiment, a parity generation method is provided for a data storage system, which comprises the steps of providing a plurality of storage devices for storing data, a plurality of data buses for transferring said data, a plurality of selectors and a parity generation circuit; dividing said plurality of storage devices into a plurality of groups; connecting said plurality of storage devices and said plurality of data buses to the selector for each group, and calculating by one group of selectors first parity data which is parity of data of the storage devices connected to said one group of selectors. The method further comprises the steps of supplying said first parity data to one of said data buses and transferring it to said parity generation circuit, and calculating second parity data which is parity between the transferred first parity data and the data of the other data bus, by said parity generation circuit.

Preferably this method further comprises the steps of preparing a parity buffer memory, and storing plurality of bytes of said second parity data in said parity buffer memory; transferring data to one of said data buses word by word; reading out said second parity data stored in said parity buffer memory from said parity buffer memory one byte by one byte; and calculating, in said parity generation circuit, third parity data which is parity between the data of said data bus and said second parity data word by word. The supplying step is repeated for each of the plural bytes.

Since, in an invention such as this, the selector includes a parity operation function calculator, part of the parity operation that has so far been obtained in the parity generation circuit can selectively be performed in the selector, so the number of times the parity operation is executed by the parity generator can be reduced.

Therefore, the number of times the parity is transferred through the data bus to the parity generation circuit can be reduced, and the amount of transferring of parity to the data bus can be reduced. Note that it is a matter of course that the parity used herein applies to exclusive OR operation to be described hereinafter and also to various methods known to those skilled in the art.

The above-described invention will become apparent from the following detailed description of an embodiment thereof.

DESCRIPTION OF THE PREFERRED EMBODIMENT

Figure 2:
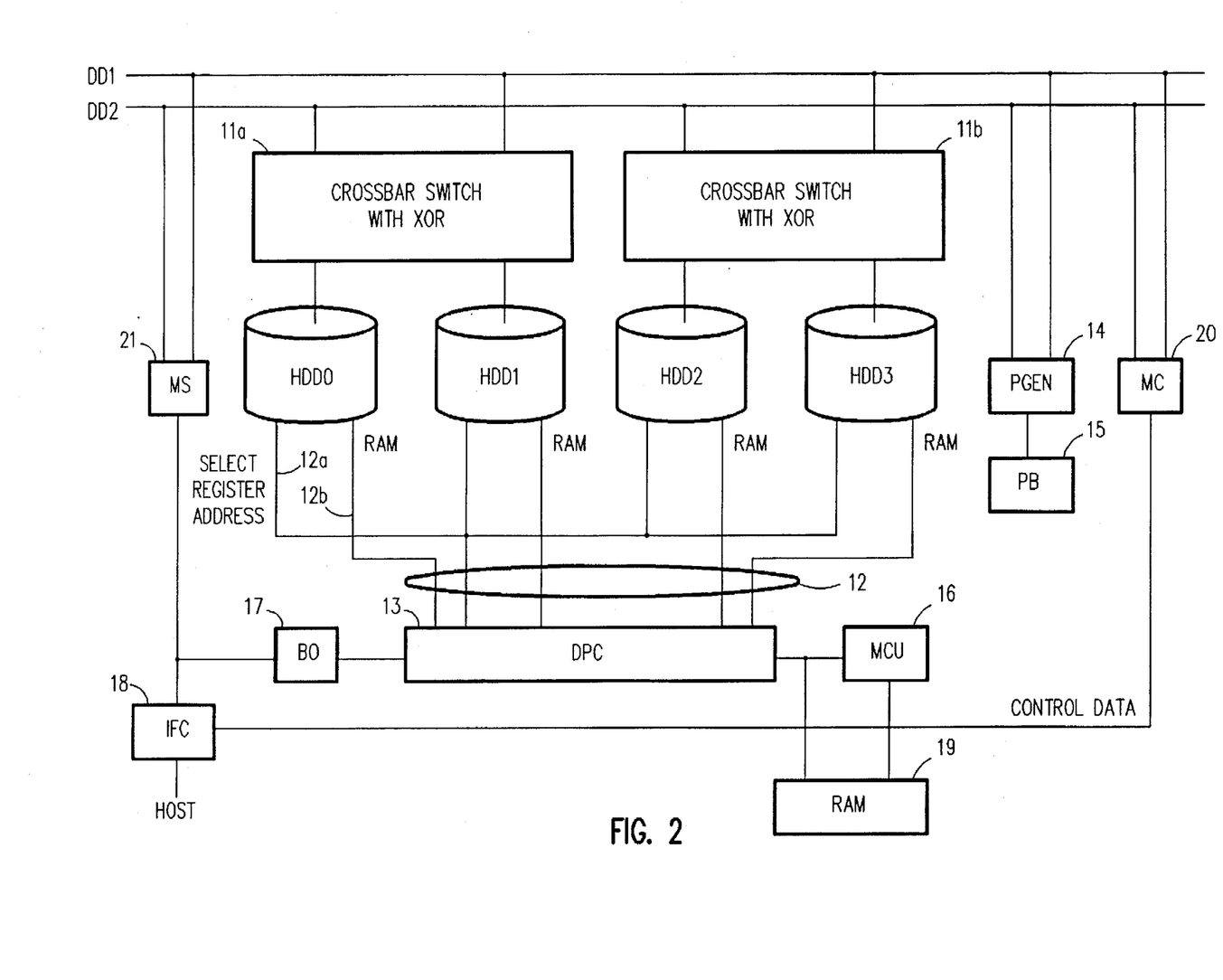
FIG. 2 is a block diagram showing a system of the preferred embodiment of the present invention.

FIG. 2 is a block diagram showing a system of the preferred embodiment of the present invention. While this embodiment will be described with reference to the case where four storage means are connected to two shared buses, for the convenience of explanation, it is a matter of course that the present invention is not limited to this but can apply to a more complicated system in which more than five HDDs are connected to three data buses.

Two channels of each of four-channel crossbar switches 11a and 11b with an exclusive OR operation function are connected to data buses DD0 and DD1, respectively, which are a shared bus. The other two channels of crossbar switch 11a which acts as a selector are connected to the drives HDD0 and HDD1. Likewise, the other two channels of crossbar switch 11b are connected to the drives HDD2 and HDD3. The crossbar switches 11a and 11b are controlled by the address signal and control signal outputted by a data path controller 13, so that a connection between an arbitrary combination of a drive and data bus becomes possible. Each drive HDD0 to HDD3 is connected to the data path controller 13 through a control line 12 consisting of a select line 12a, an address bus, and read/write (R/W) lines 12b. That is, each of the drives HDD0 to HDD3 shares the select line 12a, which is connected to the input/output terminal of the data path controller 13. Each of the drives HDD0 to HDD3 also shares the address bus connected to the input/output terminal of the data path controller 13. Further, the drives HDD0 to HDD3 are connected through the R/W lines 12b to the data path controller 13 to instruct reading or writing, respectively. By this data path controller 13, the activity statuses of the plurality of drives in the system are monitored.

The data buses DD0 and DD1 are connected to the channels of a parity generation circuit 14, respectively, which generates parity data that is parity of data supplied. The other channel of this parity generation circuit 14 is connected to a parity buffer memory 15 for temporarily storing the parity data generated by the parity generation circuit 14. Note that in this embodiment a control signal for controlling the parity buffer memory 15 is given by the parity generation circuit 14.

To the data path controller 13 there are connected a microcomputer control unit (hereinafter referred to as an MCU) 16 and a center buffer 17. The center buffer 17 is connected to a host interface chip 18. The MCU 16 is connected to a random access memory (hereinafter referred to as a RAM) 19 for storing a control program of the MCU 16. The RAM 19 is also connected to the data path controller 13. The MCU 16 data bus can selectively be connected to the data bus DD0 or DD1 by the switching of a multiplexer 20 and is also connected to the host interface chip 18. The host data bus of the host interface chip 18 can selectively be connected to the data bus DD0 or DD1 by the switching of a multiplexer 21.

The operation in a system such as this will hereinafter be described. Among control signals to be inputted to the crossbar switches 11a and 11b, there is a control signal for deciding whether the exclusive OR operation function of the crossbar switch is executed. If this parity activation signal goes to a predetermined state, the exclusive OR of the input data supplied to the channel of the crossbar switch will be calculated and the parity data will be outputted to a desired channel.

In the case of the normal operation mode in which no damaged disk is in the system, the parity generation such as the parity update at the time of writing data is executed by the parity generation circuit 14. Therefore, it is not necessary in the crossbar switch to do the parity operation. At this time, the data path controller 13 outputs a first-state control signal and an address signal so that the crossbar switch connects a desired channel to channel. Then, through the data buses DD0 and DD1, data is read out from the drive or data is written to the drive.

A read operation when one of the drives in the system has failed will next be described with reference to the case that the drive HDD0 failed. The reconstruction of data stored in this damaged drive HDD0 is implemented by calculating the exclusive OR of data stored in the other drives HDD1, HDD2, and HDD3. First, the crossbar switches 11a and 11b are set to parity generation mode in which the exclusive OR of input data is outputted. This setting is performed by a second-state control signal from the data path controller 13. Next, the crossbar switch 11b to which the damaged drive HDD0 has not been connected reads out the data of the drives HDD2 and HDD3 connected thereto and obtains parity data which is the exclusive OR of these data. Then, in order to transfer this parity data to the data bus DD0 (or DD1), the data path controller 13 outputs an address signal. The transferred parity data is inputted through the data bus DD0 (or DD1) to the crossbar switch 11a to which the damage drive HDD0 has been connected. The crossbar switch 11a calculates the exclusive OR between the data read out from the drive HDD1 connected thereto and the parity data inputted from the data bus.

This obtained data is the same value as the data that the damaged drive HDD0 had stored. The reading of the data stored in the damaged disk is identified by outputting this obtained data to the channel to which the data bus DD1 (or DD0) was connected and outputting to the outside through the host interface chip 18. Also, the reconstruction of the data stored in the damaged disk is accomplished by outputting this obtained data to the channel connected to a new disk which replaced the damaged disk and storing this data in the new disk.

In this sequence of operations, in order for the exclusive OR operation to be performed in the crossbar switch before data is outputted from the drive to the data bus, the transfer step to the data bus is performed only one time and the data transfer to the parity generation circuit 14 is not needed. In the background art, two extra steps were needed, a step of storing the parity of the byte unit transferred to two buses in the parity buffer memory 15 once and a step of transferring this stored data to the data bus. Since the second step of these two steps is executed after data of predetermined data unit, such as sector unit, has been stored, the execution speed of the data transfer in the two steps was low.

By contrast, in a sequence of operations in the above-described system, it is not always necessary to wait for data to be stored up to a predetermined unit, because the parity of data for each byte is calculated and then transferred to the data bus. Therefore, even at the time of drive failure, high-speed data transfer becomes possible and high-speed data reading and reconstruction become possible.

Note that the above-described operation step is a preferred example and various modifications thereof are possible. Another operation step different from the above-described step will be described with reference to the reconstruction (data reconstruction) in the case that the drive HDD0 failed, as an example. The crossbar switch 11a is set to the parity generation mode, but the crossbar switch 11b is set to the normal mode without setting it to the parity generation mode. By giving the crossbar switch 11b a predetermined address signal, the data stored in the drives HDD2 and HDD3 are transferred to the data buses DD0 and DD1, respectively. And, identifying the data stored in the drive HDD0 is also possible by calculating in the crossbar switch 11a the exclusive OR between the data transferred to the data bus DD0, the data transferred to the data bus DD1, and the stored data of the drive HDD1.

Further, in this system a variety of operations are possible. The following is a description of an operation for calculating exclusive OR by the crossbar switch and, based on this calculated data and other data, calculating the parity in the parity generation circuit. This operation is effective particularly when the number of drives in a system increases or when a system is more complicated. As an example, think of a case where the exclusive OR of the drives HDD0 to HDD3 is obtained and the exclusive OR between this obtained data and other data is obtained and outputted to the outside. First, in the crossbar switch 11a the exclusive OR of the data stored in the drives HDD0 and HDD1 is obtained, and this first parity data is transferred to the data bus DD0. At the same time, in the crossbar switch 11b the exclusive OR of the data stored in the drives HDD2 and HDD3 is obtained, and this data is transferred to the data bus DD1. In this way, the first parity data and the data transferred to the data bus DD1 are transferred to the parity generation circuit 14. The parity generation circuit obtains second parity data, which is the exclusive OR between the data transferred to the data bus DD0 and the data transferred to the data bus DD1.

In this step, the number of parity operations in the parity generation circuit can be reduced because the exclusive OR is obtained in the crossbar switch and supplied to the data bus. Also, the number of transfers from the temporary storage to the parity buffer memory can be reduced, so the transfer speed of data in a sequence of transfer operations can be enhanced.

Next, the second parity data calculated for each word is transferred in sequence to the parity buffer memory 15 and a plurality of words of predetermined unit (sector unit, for example) are stored in the parity buffer memory 15. After a predetermined unit of data has been stored in the parity buffer memory 15, data is transferred to the data bus DD0 and also the second parity data stored in the parity buffer memory 15 is read out in sequence, and third parity data, which is parity between the data of the data bus DD0 and the second parity data, is obtained in the parity generation circuit 14 and supplied to the data bus DD1. If the address bus consists of 16 lines, for example, data will be transferred as a unit of integer times 16 lines (2 bytes). Therefore, in synchronization with the transfer of 2 bytes of data on the data bus DD0, the stored data is read out from the parity buffer memory 15 two bytes by two bytes, and the parity of these data is obtained in the parity generation circuit 14 two bytes by two bytes and transferred to the data bus. The transfer of data is completed by repeating by the number of the above-described integer.

Note that if, as described above, the parity data obtained from the data of the data bus and the data transferred from the parity buffer memory is not transferred to the data bus but is transferred to the parity buffer memory again and this is repeated the above-described integer times, read-modify-write for a RAID 5 write operation will become possible.

This is a mere example and so various modifications thereof are possible, but in any case the system of the present invention is capable of effectively performing the parity operation and also transferring data at high speeds even in a complicated system such as a case where the number of drives is increased, by effectively combining the parity operation function of the crossbar switch and the operation steps of the parity generation circuit and parity buffer memory.

Figure 3:
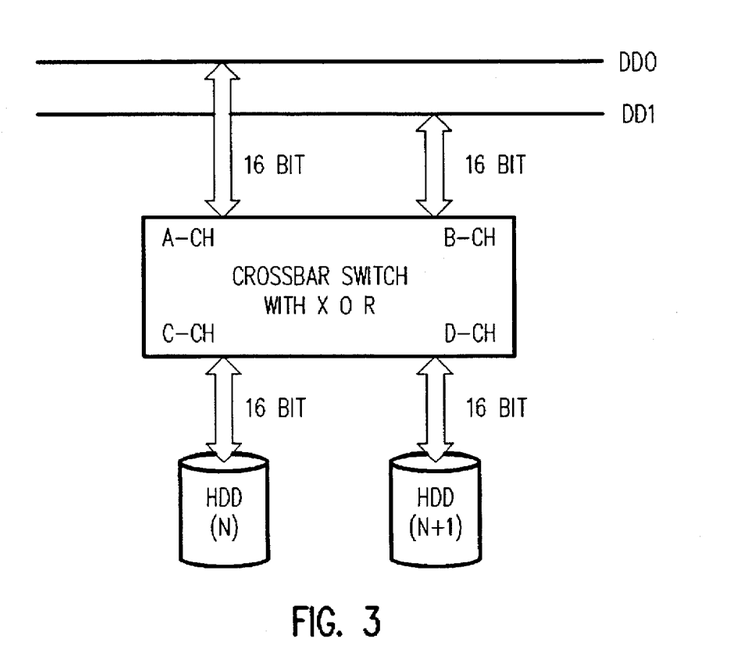
FIG. 3 is a block diagram showing the crossbar switch in the preferred embodiment.

FIG. 3 is a block diagram showing the crossbar switch of this embodiment. This crossbar switch is provided with four 16-bit (1 byte) input/output channels, and the connection between arbitrary channels can be established by a 2-bit address signal. That is, each drive can arbitrarily be connected to each data bus, and data can also be transferred directly between the drives without being passed through the data bus. This is effective to enhance the performance at the time of data reconstruction. This crossbar switch further has a function of calculating an exclusive OR. This function is controlled by a control signal and the exclusive OR is obtained when the signal is in a predetermined state.

Note that in this crossbar switch the A, B, C, and D channels thereof can be connected to any of the data buses and drives, but FIG. 3 shows a case where the A channel is connected to the data bus DD0, the B channel to the data bus DD1, the C channel to a HDD (N), and the D channel to a HDD (N+1).

Figure 4:
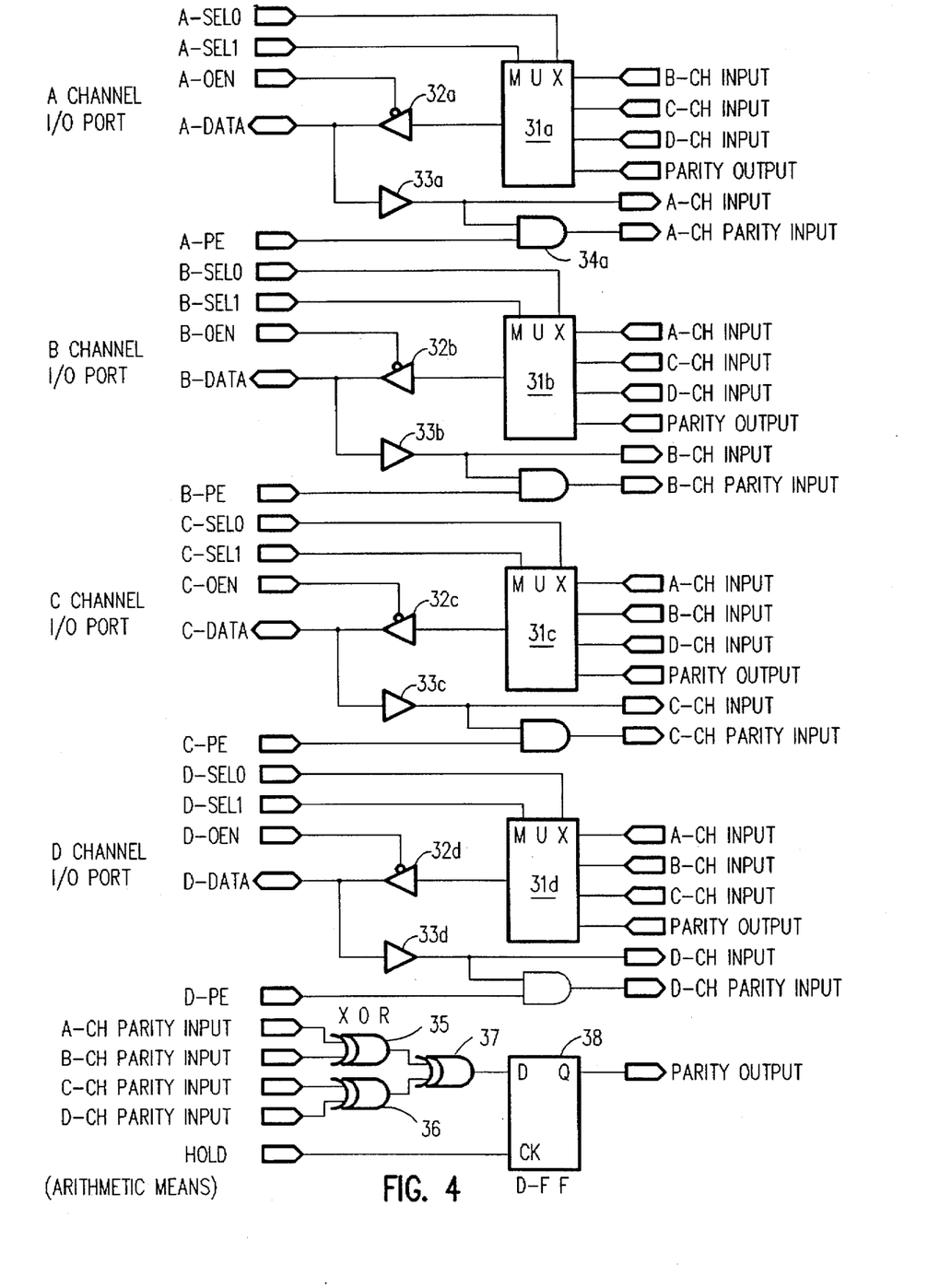
FIG. 4 is a circuit diagram of the crossbar switch in the preferred embodiment.

FIG. 4 is a concrete circuit diagram of the crossbar switch according to this preferred embodiment. This crossbar switch consists of four channel I/O ports and an operator for calculating parity of input data. Since one channel of the crossbar switch of this embodiment is constituted by 16 bits, there are 16 similar circuits but they are identical in construction, so only one of them is shown in FIG. 4. The setting of a connection between channels is performed by ah multiplexer that is controlled by address signals SEL0 (one bit) and SEL1 (one bit), which are supplied from the data path controller. Note that A-DATA, B-DATA, C-DATA, and D-DATA represent the data of the data bus DD0, the data of the data bus DD1, the data of the HDD (N), and the data of the HDD (N+1), respectively.

A preferred embodiment of an A channel I/O port will be described. Four signals B-ch Input, C-ch Input, D-ch Input, and Parity Output are inputted to a multiplexer 31a that is controlled in response to address signals A-SEL0 and A-SEL1. The output of the multiplexer 31a is inputted to a transfer gate 32a that is controlled with a control signal A-OEN. The output terminal of the transfer gate 32a is connected to the input/output terminal of the A-DATA which is the data on the data bus DD0, and also to the input terminal of a buffer 33a. The output of the buffer 33a is connected to the input terminal of the signal A-ch Input and one input of a 2-input AND gate 34a. The parity activation signal A-PE, which is one of the control signals supplied from the data path controller, is inputted to the other input terminal of the AND gate 34a. The output terminal of the AND gate 34a is connected to the output terminal of the parity input signal A-ch Parity Input.

The above-described constitution is the same for the B channel I/O port, the C channel I/O port, and the D channel I/O pod, so a description of them will not be given.

An arithmetic calculator is provided for generating a parity output signal on the basis of a parity input signal obtained in each channel I/O port. Two parity input signals A-ch Parity Input and B-ch Parity Input are inputted to a two-input XOR gate 35. Also, two parity input signals C-ch Parity Input and D-ch Parity Input are inputted to a two-input XOR gate 36. The outputs of the XOR gate 35 and the XOR gate 36 are inputted to an XOR gate 37. The output of the XOR gate 37 is supplied to a D flip-flop 38, which is a holder that is controlled by a control signal HOLD. The output of the D flip-flop 38 is connected to a Parity Output terminal.

Next, the operation of this circuit will be described, where the set signals (SEL0, SEL1) of the multiplexer for selecting an input of each channel is defined as shown in Table 1.

TABLE 1

| SEL1 - SEL0 | Output Ch. C | | | |
|---|---|---|---|---|
| | A-DATA | B-DATA | C-DATA | D-DATA |
| 00 | C | D | A | B |
| 01 | D | C | B | A |
| 10 | B | A | D | C |
| 11 | P | P | P | P |

That is, for each I/O channel port, it is shown which of the input signals is outputted by the multiplexer for the input of the address signals SEL0 and SEL1. For example, if the channel I/O port is the A channel I/O port and the SEL1: SEL0 is 00, the C-ch Input will be selected and outputted to the A-DATA. The setting of the connection between channels when XOR operation is not done is performed by giving a control signal such as that shown in Table 2.

TABLE 2

| | Control Signals | | | | | | | | | | | | | | | |
|---|---|---|---|---|---|---|---|---|---|---|---|---|---|---|---|---|
| | A channel I/O port | | | | B channel I/O port | | | | C channel I/O port | | | | D channel I/O port | | | |
| Channels | A-OEN | A-PE | DRL1 | SEL0 | B-OEN | B-PE | SEL1 | SEL0 | C-OEN | C-PE | SEL1 | SEL0 | D-OEN | D-PE | SEL1 | SEL0 |
| A→C, B→D | 1 | — | — | — | 1 | — | — | — | 0 | 0 | 0 | 0 | 0 | 0 | 0 | 0 |
| A←C, B←D | 0 | 0 | 0 | 0 | 0 | 0 | 0 | 0 | 1 | — | — | — | 1 | — | — | — |
| A→D, B→C | 1 | — | — | — | 1 | 0 | 0 | 0 | 0 | 0 | 0 | 1 | 0 | 0 | 0 | 1 |
| A←D, B←C | 0 | 0 | 0 | 1 | 0 | 0 | 0 | 1 | 1 | — | — | — | 1 | — | — | — |
| A→B, C→D | 1 | — | — | — | 0 | 0 | 1 | 0 | 1 | — | — | — | 0 | 0 | 1 | 0 |
| A←B, C←D | 0 | 0 | 1 | 0 | 1 | — | — | — | 0 | 0 | 1 | 0 | 1 | — | — | — |
| A→B, C, D | 1 | — | — | — | 0 | 0 | 1 | 0 | 0 | 0 | 0 | 0 | 0 | 0 | 0 | 1 |
| B→A, C, D | 0 | 0 | 1 | 0 | 1 | — | — | — | 0 | 0 | 0 | 1 | 0 | 0 | 0 | 0 |
| C→A, B, D | 0 | 0 | 0 | 0 | 0 | 0 | 0 | 1 | 1 | — | — | — | 0 | 0 | 1 | 0 |
| D→A, B, C | 0 | 0 | 0 | 1 | 0 | 0 | 0 | 0 | 0 | 0 | 0 | 0 | 1 | — | — | — |

For example, the A channel can be connected to the C channel and the B channel can be connected to the D channel, i.e., a case where the data bus DD0 is connected to the HDD (N) and the data bus DD1 is connected to the HDD (N+1) (top line in Table 2).

The data A-DATA on the data bus DD0 is supplied to the A-DATA terminal of the A channel I/O port. Since the control signal A-OEN for controlling the transfer gate 32a is a 1 level, the A-DATA terminal has been disconnected electrically from the multiplexer 31a, so the data A-DATA is outputted through the buffer 33a as a signal A-ch Input.

The B channel I/O port is also operated in the same way, so the data B-DATA on the data bus DD1 is outputted through a buffer 33b as a signal B-ch Input. In the C channel I/O port, a multiplexer 31c selects the signal A-ch Input because the address signals SEL1 and SEL0 are both 0 levels, and since a control signal C-OEN is a 0 level, the output terminal of the multiplexer 32c is connected to a C-DATA terminal, so the signal A-ch Input (i) is outputted as an output of the C-DATA terminal. Likewise, in the D channel I/O port, a multiplexer 31d selects the signal B-ch Input because the address signals SEL1 and SEL0 are both 0 levels, and since a control signal C-OEN is a 0 level, the output terminal of the multiplexer 32d and a D-DATA terminal are connected, so the signal B-ch Input is outputted as an output of the D-DATA terminal.

The connection between channels when the XOR operation is performed is established by giving a control signal such as that shown in Table 3.

TABLE 3

| | Control Signals | | | | | | | | | | | | | | | |
|---|---|---|---|---|---|---|---|---|---|---|---|---|---|---|---|---|
| | A channel I/O port | | | | B channel I/O port | | | | C channel I/O port | | | | D channel I/O port | | | |
| Channels | A-OEN | A-PEN | SE1 | SE0 | B-OEN | B-PEN | SE1 | SE0 | C-OEN | C-PEN | SE1 | SE0 | D-OEN | DPEN | SE1 | SE0 | HOLD H |
| A⊕B⊕C⊕D→hold | 1 | 1 | — | — | 1 | 1 | — | — | 1 | 1 | — | — | 1 | 1 | — | — | L |
| B⊕C⊕D→A | 0 | 0 | 1 | 1 | 1 | 1 | — | — | 1 | 1 | — | — | 1 | 1 | — | — | L |
| A⊕C⊕D→B | 1 | 1 | — | — | 0 | 0 | 1 | 1 | 1 | 1 | — | — | 1 | 1 | — | — | L |
| A⊕B⊕D→C | 1 | 1 | — | — | 1 | 1 | — | — | 0 | 0 | 1 | 1 | 1 | 1 | — | — | L |
| A⊕B⊕C→D | 1 | 1 | — | — | 1 | 1 | — | — | 1 | 1 | — | — | 0 | 0 | 1 | 1 | L |
| A⊕B→C,D | 1 | 1 | — | — | 1 | 1 | — | — | 0 | 0 | 1 | 1 | 0 | 0 | 1 | 1 | L |
| C⊕D→A,B | 0 | 0 | 1 | 1 | 0 | 0 | 1 | 1 | 1 | 1 | — | — | 1 | 1 | — | — | L |

For example, the exclusive OR between the C channel and the D channel can be outputted to the A and B channels, i.e., a case where the data stored in the HDD (N) and the HDD (N+1) are outputted to the data buses DD0 and DD1 (bottom line in Table 3).

The data C-DATA on the HDD (N) is supplied to the C-DATA terminal of the C channel I/O port. Since the control signal C-OEN for controlling the transfer gate 32c is a 1 level, the C-DATA terminal has been disconnected electrically from the multiplexer 31c, so the data C-DATA is outputted through the buffer 33c as a signal C-ch Input. And, since the parity activation signal C-PE is a 1 level, the parity input signal C-ch Parity Input which is an output of the AND gate 34c is outputted as a signal having the same level as the data C-DATA. The D channel I/O port is also operated in the same way, so the data D-DATA stored in the HDD (N+1) is outputted through the buffer 33d as a signal D-ch Input. The parity input signal D-ch Parity Input which is an output of the AND gate 34d is outputted as a signal having the same level as the data D-DATA. In the A channel I/O port the multiplexer 31a selects the parity output signal Parity Output because both the address signals SEL1 and SEL0 are a 1 level, and since the control signal C-OEN is a 0 level, the output terminal of the multiplexer 32a and the A-DATA terminal are connected, so the parity output signal Parity Output is outputted as an output of the A-DATA(I) terminal. Likewise, in the B channel I/O port the multiplexer 31b selects the parity output signal Parity Output because both the address signals SEL1 and SEL0 are a 1 level, and since the control signal B-OEN is a 0 level, the output terminal of the multiplexer 32b and the B-DATA terminal are connected, so the parity output signal Parity Output is outputted as an output of the B-DATA terminal.

Since in this case the parity activation signals A-PE and B-PE are a 0 level, the parity input signals A-ch Parity Input and B-ch Parity Input are a 0 level. Therefore, in the output signal Parity Output of the parity generation circuit, the exclusive OR between the data C-Data and the data D-Data is to be outputted. And, since the Parity Output terminal has been connected to the A-DATA terminal and the B-DATA terminal, as described above, the parity output signal Parity Output (I) is supplied to these terminals.

While a representative combination has thus been described, arbitrary connection between channels and parity calculation are possible by combining control signals. Also, since only a limited number of combinations are actually necessary, a control signal can also be encoded to reduce the number of signals.

Further, in this parity generation circuit, the exclusive OR of the data in the A, B, C, and D channels can also be calculated and temporarily stored in the flip-flop which is a holder. That is, all control signals OEN and all control signals PEN are made a 1 level. In this case, all DATA signal terminals and the multiplexer are electrically disconnected and also the data DATA are supplied to the Parity Input terminals of the respective channels. The exclusive OR of the parity input signals Parity Input which are inputted to the parity generation circuit is outputted from the XOR gate 37. The flip-flop 38 is held in its hold state by making a control signal HOLD a predetermined state, so that the data which is exclusive OR can be held temporarily during the time the control signal HOLD is in the predetermined state.

For example, in the case where other data has already been supplied to the channel to which you want to supply parity data, the holder can hold the parity data temporarily and shift the timing at which the parity data is outputted to that channel, by operating the flip-flop in the above-described way. Also, in the case where the parity of data supplied to all of channels is calculated, for example, there is no channel for outputting parity data because other data have already been supplied to all channels, the hold means, holds the parity data temporarily and shifts the timing, so the parity data can be supplied to a desired channel.

Note that it is a matter of course that the selector means is not limited to the above-described circuit and various modifications and alternations thereof are possible and also the holder means is not limited to the flip-flop.

Further, while in the above-described embodiment the crossbar switches have been provided between all drives and data buses, the crossbar switch of the present invention may be provided only for a certain group of drives and for the other groups, the data buses and the drives may be connected directly without the crossbar switch of the present invention.

Thus, in the present invention, the parity generation can be made easier and also the reconstruction data at the time of an occurrence of failure can be performed with high efficiency and high speed.

We claim:

1. A data storage system comprising:
    a plurality of storage devices for storing data;
    a plurality of data buses for transferring said data;
    a selector connected between said plurality of storage devices and said plurality of data buses, said selector including a parity generator and a multiplexer,
    wherein said parity generator calculates parity data of data supplied to said plurality of storage devices and said plurality of data buses in response to a control signal and outputs parity data, and said multiplexer selectively supplies said data of said plurality of storage devices, said data of said plurality of data buses, or said parity data to said plurality of storage devices or said plurality of data buses, in response to an address signal; and a parity generation circuit connected to said plurality of data buses, wherein said parity generation circuit calculates parity based on said parity data obtained by said parity generator, data supplied to said data buses and data supplied to said parity generation circuit.

2. The data storage system as set forth in claim 1, further comprising a parity buffer memory connected to said parity generation circuit, wherein said parity buffer memory stores said parity obtained by said parity generation circuit.

3. A data storage system comprising:

a plurality of storage devices for storing data;

a plurality of data buses for transferring said data;

a selector comprising a plurality of channels connected between said plurality of storage devices and said plurality of data buses, said selector comprising a plurality of first gate means, operation means for performing a parity operation, and a plurality of multiplexers, wherein each of said plurality of first gate means transfers data supplied to the respective channels to said operation means in response to a first control signal, said operation means calculates parity data for each set of data transferred by said plurality of first gate means and outputs said parity data, said data supplied to the respective channels and said parity data are input to said multiplexers, and each of said multiplexers selectively supplies to one of said channels the data of the other of said channels or said parity data;

a parity generation circuit with a plurality of channels; and a parity buffer memory, wherein said channels of said parity generation circuit are connected to said plurality of data buses and to said parity buffer memory, and wherein said parity generation circuit calculates second parity data based on said parity data supplied to one of said channels connected to one of said data buses and other data supplied to the other channel connected to the other data bus, and supplies said second parity data to the channel connected to said parity buffer memory.

4. A parity generation method for a data storage system, comprising a plurality of storage devices for storing data, a plurality of data buses for transferring said data, a plurality of selectors, and a parity generation circuit, said method comprising the steps of:

(a) dividing said plurality of storage devices into a plurality of groups;

(b) connecting said plurality of storage devices and said plurality of data buses to the selector for each group;

(c) calculating by one group of selectors first parity data which is parity of data of the storage devices connected to said one group of selectors;

(d) supplying said first parity data to one of said data buses and transferring it to said parity generation circuit; and (e) calculating second parity data based on the transferred first parity data and the data of the other data bus, by said parity generation circuit.

5. The parity generation method as set forth in claim 4, further comprising the steps of:

(f) storing a plurality of bytes of said second parity data in parity buffer memory; and (g) transferring data to one of said data buses one byte at a time:

(i) reading out said second parity data stored in said parity buffer memory from said parity buffer memory one byte at a time; and (ii) calculating, in said parity generation circuit, third parity data based on the data of said data bus and said second parity data one byte at a time.

6. A data storage system comprising:

a plurality of storage devices for storing data;

a plurality of data buses through which data is transferred;

a selector, coupled to said plurality of storage devices and said plurality of data buses, for selectively connecting the storage devices and the data buses in a predetermined combination, the selector having a parity operation generator; and a parity generation circuit, connected to the plurality of data buses, wherein the parity generation circuit calculates parity data based on the data obtained from said parity operation generator and data supplied to the data buses.

* * * * *